United States Patent [19]

Britain et al.

[11] 4,206,102

[45] Jun. 3, 1980

[54] METHOD OF PRODUCING POLYURETHANES WITH INCREASED RESISTANCE TO ABRASION

[75] Inventors: J. W. Britain, New Martinsville, W. Va.; George J. Schexnayder, Pittsburgh, Pa.

[73] Assignee: Mobay Chemical Corporation, Pittsburgh, Pa.

[21] Appl. No.: 723,376

[22] Filed: Sep. 15, 1976

[51] Int. Cl.² .............................................. C08L 91/00
[52] U.S. Cl. ................................ 260/28 R; 260/42.24; 260/42.43; 525/123; 525/129; 525/130
[58] Field of Search ................ 260/28 R, 858, 859 R, 260/42.24, 42.43; 525/123, 129, 130

[56] References Cited

U.S. PATENT DOCUMENTS

| | | | |
|---|---|---|---|
| 2,951,053 | 8/1960 | Reuter et al. | 260/28 |
| 3,201,359 | 8/1965 | Herrick et al. | 260/28 |
| 3,344,064 | 9/1967 | Brady et al. | 260/28 |

*Primary Examiner*—Melvyn I. Marquis
*Attorney, Agent, or Firm*—Gene Harsh; Joseph C. Gil

[57] ABSTRACT

Abrasion resistant polyurethane elastomers using a combination of a waxing agent, a powdered mineral type lubricant and a polyhalogenated polyalkylene powder are disclosed. Although all three types are known to impart abrasion resistance to polyurethane elastomers, a synergistic effect has been found in the use of these additives such that better abrasion resistance is found with smaller quantities of additives.

4 Claims, No Drawings

METHOD OF PRODUCING POLYURETHANES WITH INCREASED RESISTANCE TO ABRASION

The present invention generally relates to polyurethane elastomers with additives which impart abrasion resistance and low friction factors.

BACKGROUND OF THE INVENTION

It is well known to use various release aids, slip agents, internal and external lubricants, and various polymers as blends or on the surface of polyurethanes for reducing surface friction and increasing abrasion resistance.

For example, in Mobay Chemical Co., Technical Bulletin TIB 37-V13, "Semi-Self Lubricating Multrathane Types from Graphite," the advantages of using graphite as an additive are discussed. Also in U.S. Pat. No. 2,951,053 the use of molybdenum disulfide is disclosed. The use of these additives enables polyurethane elastomers to be used in applications requiring low friction. The elastomers become essentially self-lubricating and more abrasion resistant.

DESCRIPTION OF THE INVENTION

It has been found that combinations of certain additives in small amounts are more useful and produce polyurethanes with better abrasion resistance than are obtainable with only one of the additives. It has also been found that less of the combination of additives is required than would be expected on the basis of the observed results from each alone.

Accordingly, the present invention relates to the use of a combination of a waxing agent, a powdered mineral type lubricant and powdered polyhalogenated polyalkylenes in conjunction with the making of polyurethane elastomers. It is possible to use a smaller amount of a combination of additives than would be necessary to impart a similar resistance given a similar amount of only one additive.

Suitable starting materials for the production of elastomeric polyurethanes according to the invention include those organic compounds which contain at least two hydroxyl groups and have a molecular weight of from about 800 to about 5000, preferably a molecular weight of from about 1000 to about 3000.

Any suitable hydroxyl polyester may be used such as linear or slightly branched polyesters obtained, for example, from oxycarboxylic or carboxylic acids and mono- or polyhydric alcohols optionally with amino alcohols, diamines, oxyamines and diamino alcohols. Any suitable polycarboxylic acid may be used such as, for example, oxalic acid, malonic acid, succinic acid, glutaric acid, adipic acid, pimelic acid, suberic acid, azelaic acid, brassylic acid, sebacic acid, thapsic acid, maleic acid, fumaric acid, glutaconic acid, diethylsuccinic acid, isophthalic acid, terephthalic acid, 1,4-cyclohexanedicarboxylic acid, and the like as well as hydroxy carboxylic acids. Any suitable primary hydroxylic polyhydric alcohol may be used such as, for example, ethylene glycol, diethylene glycol 1,5-pentane diol, 1,6-hexane diol, 1,7-heptane diol and the like. The polyesters may contain double or triple bonds in unsaturated fatty acid moieties.

Any suitable linear or slightly branched polyether, such as, a polyhydric polyalkylene ether may be used such as, for example, the condensation product of an alkylene oxide optionally with any suitable initiator. The initiator may be difunctional compounds including water so that the resulting polyether is essentially a chain of repeating alkylene oxy groups as in polyethylene ether glycol, poly 1,4-butylene ether glycol and the like; of the initiator may be any suitable active hydrogen containing compound which may be a monomer or even a compound having a relatively high molecular weight including other active hydrogen containing compounds as disclosed above. It is preferred that the initiator has 2 active sites to which the alkylene oxides may add including, for example, amines, polyfunctional alcohols, amino alcohols and the like. Any suitable alkylene oxide may be used such as, for example, ethylene oxide, tetrahydrofuran and epihalohydrins. Copolymers of this type may also be used. Any suitable initiator may be used including, for example, water, polyhydric alcohols, preferably having 2 hydroxyl groups, amino alcohols, amines preferably having 2 replaceable hydrogen atoms bonded to nitrogen atoms.

There are many desirable processes for the preparation of polyhydric polyalkylene ethers including U.S. Pat. Nos. 1,922,459, 3,009,939 and 3,061,625 or by the process disclosed by Wurtz in 1859 and in *Encyclopedia of Chemical Technology*, Volume 7, pages 257 to 262, published by Interscience Publishers, Inc. (1951).

Specific examples of difunctional initiators (i.e., those having two active hydrogen atoms) are water, ethylene glycol, aniline, diethylene glycol, hexane-1,6-diol, N-methyl diethanolamine and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters. Also, any suitable polycarbonates may be employed if desired. It is also possible to employ mixtures of various organic compounds having at least two hydroxyl groups and a molecular weight of from about 800 to about 5,000.

Any suitable organic diisocyanate may be used in the process of the present invention including aromatic, aliphatic and hetrocyclic diisocyanates. In other words, two isocyanate radicals may be bonded to any suitable divalent organic radical to produce the organic diisocyanates which are useful in accordance with the present invention including acyclic, alicyclic, aromatic and hetrocyclic radicals. Suitable organic polyisocyanates are, therefore, ethylene diisocyanate, ethylidene diisocyanate, propylene-1,2-diisocyanate, 1,4-butane diisocyanate, 1,6-hexane diisocyanate, 1,8-octamethylene diisocyanate, cyclohexylene-1,2-diisocyanate, m-phenylene diisocyanate, 2,4-toluene diisocyanate, 2,6-toluene diisocyanate, 3,3'-dimethyl-4, 4'-biphenylene diisocyanate, 3,3'-dimethoxy-4,4'-biphenylene diisocyanate, 3,3'-dichloro-4,4-biphenylene diisocyanate, 1,5-naphthalene diisocyanate, furfurylidene diisocyanate and the like.

Examples of preferred diisocyanates include aliphatic diisocyanates, having the general formula:

wherein n represents a number from 2 to 8; cycloaliphatic diisocyanates, such as hexahydrotolylene-2,4- and 2,6-diisocyanate and mixtures of these isomers, 4,4'-dicyclohexyl methane diisocyanate, 1,4-diisocyanato cyclohexane, 1,3-diisocyanato cyclohexane, araliphatic diisocyanates such as tolylene-2,4 or 2,6-diisocyanate and mixtures of these isomers such as a mixture of 80% 2,4-toluene diisocyanate and 20% 2,6-toluene diisocyanate, phenylene-1,4-diisocyanate, phenylene-1,3-diisocyanate, diphenylmethane-4,4'-diisocyanate, diphenyl ether 4,4'-diisocyanate, naphthylene-1,5-diisocyanate and the like. Isophorone diisocyanate and ester diisocyanates of carboxylic acid of the kind described, for example, in British Patent Specifications No. 965,474 and 1,072,956 may also be used as diisocyanates in accordance with the invention. Proportions of triisocyanates such as, benzene-1,3,5-triisocyanate or p,p',p"-triphenyl methane triisocyanate and the like may be used. Most preferred isocyanates are p-phenylene diisocyanate, diphenylmethane-4,4'-diisocyanate and naphthalene-1,5-diisocyanate.

In addition to polyols which contain primary hydroxyl groups, it is also possible to use polyols which contain secondary hydroxyl groups, provided they are used in the form of prepolymers. Some examples of compounds containing secondary hydroxyl groups are 1,2-propylene glycol, 1,3-butylene glycol, 1,3-pentane diol, 1,4-pentane diol and the like. The most preferred prepolymers of secondary hydroxyl group containing compounds are those prepared from propylene glycol and diphenyl methane diisocyanate and polyesters containing secondary hydroxyl groups with diphenyl methane diisocyanate.

The elastomers may be prepared by the known one-shot or prepolymer methods and the formulations may include, in addition to these components mentioned above, various catalysts, fillers and the like which are known. Extensive details concerning the formulations and processing parameters for making polyurethane elastomers may be found in e.g. Saunders and Frisch, *Polyurethanes: Chemistry and Technology, Part II*, 1974, pages 299–451 and Wright and Cumming, *Solid Polyurethane Elastomers*, Maclaren and Sons Ltd., London, (1969).

In general the invention is preferably directed to harder polyurethane elastomers such as one-shot and prepolymer type cast elastomers but is applicable to all types of elastomers. The abrasion resistant additives may be mixed in with the prereacted polyurethane formulation or one of its components in an extruder or some other known mixing device. The preferable mixing means is in a Banbury mixer.

Among the powdered mineral type lubricants are graphite, molybdenum disulfide, tungsten disulfide, mica, talc, sternbergite, tetradymite, and the like. Certain of these compounds such as molybdenum disulfide are suitable although not preferred due to their degrading effect on the final product when exposed to humid ageing. Graphite is particularly preferred.

Among the polyhalogenated, polyalkylene powders which are useful as components in the present invention are various polyhalogenated polyethylenes and polypropylenes known in the art. Particularly preferred are Teflon and Teflon-related compounds e.g., tetrafluoroethylene fluorocarbon polymers and fluorinated polyethylene and polypropylene.

Suitable waxing agents include those which are well known, such as vegetable waxes. Hoechst waxes S, L, E, OP, S and C; polyethylenes polypropylenes, chlorinated paraffins polyoxyethylenes, carbowax, certain high molecular weight hydrocarbons, certain carboxylic acids and salts, esters, hydroxyl compounds, carbonyl compounds, amides, amines and polymeric lubricants etc., may also be used. Details concerning these types of waxing agents may be found in *Encyclopedia of Polymer Science and Technology*, Vol. 8, pp. 325–338, Vol. 14, pp. 768–778 and in *Encyclopedia of Chemical Technology* (2 nd ed.), Vol. 22, pp. 156–173, the disclosures of which are herein incorporated by reference.

The abrasion resistance of a given polyurethane will greatly vary with its formulation. The effect of any particular additive and any given amount thereof on a particular polyurethane cannot be uniformly predicted with general rules. However, according to the invention the additives may be used in combined amounts of from about 0.1 to about 10% by weight based on the weight of the polyurethane. It is preferred that 0.5 to 5% be used. The relative amounts of each of the three types of abrasion resistant additives used may vary within wide limits. It is preferred that each additive be used in a weight ratio of between 1:5 and 5:1 with respect to any other additive.

The polyurethane elastomers of the present invention are particularly useful in applications requiring that the product possess high abrasion resistance and a low friction factor. The elastomers may be used, for example, as impression rolls, auto panels, press brake forming dies, solid tires, pallet rollers, liners, gears, gravure rolls, top lift cleats etc.

EXAMPLES

In the following examples the method used for determining abrasion resistance is the Taber Abrasive Test which is explained in Encyclopedia of Polymer Science and Technology, Vol. 1, p. 16 (1964 ed.) and in ASTM Spec D-1175 (1961). Briefly, the specimen is rotated on a turntable and a pair of loaded abrasive wheels on edge describe a rotary transverse sliding action across its surface. Loss of weight on a revolution scale is the measure of abrasion.

The polyethylene used was a Union Carbide wax, DNDA-0917, with a density of 0.915 g/cm$^3$ and a melt index of 23.

Hoechst wax "C" is the bisstearamid of ethylene diamine.

Armoslip "CP" is a technical grade wax of an amide of oleic acid.

Poly-F is polytetra fluoro ethylene in finely powdered form (200 mesh or less), FLUON from ICI.

Graphite is grade 280 dry Ashbury powdered graphite.

Moly-S is molybdenum disulfide in finely powdered form.

EXAMPLE 1

In the following table, Table 1, the abrasion resistance of a polyurethane elastomer which has a variety of of additives is shown.

The polyurethane is prepared by reacting together:
60 parts of MDI
100 parts of (polybutylene adipate)
35 parts of (bis-B-Hydroxyethoxy) benzene The table includes test results using a variety of additives. The polyethylene, Hoechst wax "C", and Armoslip "C" are waxes; Graphite and Moly-S are powdered mineral type lubricants; and Poly-F is of the polyhalogenated polyalkylene powder type additive.

As can be seen from sets 5, 6 and 8, very low Taber test results are found when small amounts of additives from each of the three groups is present. In contrast, the results are much higher when only additives from one or two groups are used, e.g., set 2 where only wax is used; sets 3, 7, 9 and 10 where only a wax and mineral lubricant are used; and set 4 where only a wax and teflon additive are used.

EXAMPLE 2

The elastomer formulation used in preparing the polyurethanes in this example is the same as in Example 1 except that 11.25 parts of ethylene glycol are used as the chain-extending agent. The results of using various additives in this elastomer are shown in Table 2.

The synergistic effect of using a combination of the three additives is vividly demonstrated in the results in Table 2. In set 5 where each of the three types of additives is used the Taber losses are consistently low while only 2–3 phr of combined additives are used. Low results are not obtained in sets 1, 3 and 4 when a wax is used alone, in combination with Moly-S or in combination with graphite. While low results are obtained in set 2 with polyethylene and Poly-F, the amount of Poly-F required is between about 5–30 phr, a considerable greater amount of additives than is required in set 5 where the combination is used.

TABLE I

| Set | Polyethylene phr | Hoechstwax "C" phr | Armoslip "CP" phr | Graphite phr | Moly-S phr | Poly-F phr | Taber Text mg lost (low No. best) |
| --- | --- | --- | --- | --- | --- | --- | --- |
| 1 | 0 | 0 | 0 | 0 | 0 | 0 | 124.9 (av. of 4) |
|  | 1 | 0 | 0 | 0 | 0 | 0 | 67.0 (av. of 7) |
| 2 | 1 | 0.5 | 0 | 0 | 0 | 0 | 49.7 (av. of 2) |
|  | 0 | 0.5 | 0 | 0 | 0 | 0 | 65.7 (av. of 2) |
|  | 1 | 0 | 0 | 1 | 0 | 0 | 70 |
|  | 1 | 0 | 0 | 2 | 0 | 0 | 65 |
| 3 | 1 | 0 | 0 | 3 | 0 | 0 | 68 |
|  | 1 | 0 | 0 | 5 | 0 | 0 | 50 |
|  | 1 | 0 | 0 | 7 | 0 | 0 | 78 |
|  | 1 | 0 | 0 | 10 | 0 | 0 | 86 |
|  | 1 | 0 | 0 | 0 | 0 | 1 | 52 |
|  | 1 | 0 | 0 | 0 | 0 | 2 | 41 |
|  | 1 | 0 | 0 | 0 | 0 | 3 | 63 |
|  | 1 | 0 | 0 | 0 | 0 | 5 | 28 (av. of 2) |
| 4 | 1 | 0 | 0 | 0 | 0 | 7 | 24 |
|  | 1 | 0 | 0 | 0 | 0 | 10 | 48 |
|  | 1 | 0 | 0 | 0 | 0 | 30 | 51 |
|  | 1 | 0 | 0 | 0 | 0 | 50 | 80 |
|  | 1 | 0 | 0 | 2 | 0 | 2 | 27 |
|  | 1 | 0 | 0 | 2 | 0 | 1 | 27 |
| 5 | 1 | 0 | 0 | 1 | 0 | 2 | 19 |
|  | 1 | 0 | 0 | 1 | 0 | 1 | 22 |
|  | 1 | 0 | 0.5 | 1 | 0 | 1 | 25.2 (av. of 3) |
| 6 | 1 | 0 | 0.5 | 0.5 | 0 | 0.5 | 23.4 (av. of 3) |
|  | 1 | 0 | 0 | 0 | 1 | 0 | 51 |
|  | 1 | 0 | 0 | 0 | 2 | 0 | 53 |
| 7 | 1 | 0 | 0 | 0 | 3 | 0 | 32 |
|  | 1 | 0 | 0 | 0 | 5 | 0 | 41 |
|  | 1 | 0 | 0 | 0 | 10 | 0 | 55 |
| 8 | 1 | 0 | 0 | 0 | 2 | 2 | 25 |
|  | 1 | 0 | 0 | 2 | 2 | 2 | 30 |
| 9 | 1 | 0 | 0 | 2 | 2 | 0 | 77 |
| 10 | 1 | 0 | 0 | 0 | 50 | 0 | 305 |

TABLE 2

| Set | Polyethylene phr | Poly-F phr | Graphite phr | Moly-S phr | Taber Test mg lost (low No. best) |
| --- | --- | --- | --- | --- | --- |
| 1 | 1 | 0 | 0 | 0 | 32 |
|  | 1 | 1 | 0 | 0 | 27 |
|  | 1 | 2 | 0 | 0 | 33 |
| 2 | 1 | 5 | 0 | 0 | 13 |
|  | 1 | 10 | 0 | 0 | 13 |
|  | 1 | 30 | 0 | 0 | 17 |
|  | 1 | 50 | 0 | 0 | 55 |
|  | 1 | 0 | 0 | 5 | 29 |
| 3 | 1 | 0 | 0 | 10 | 42 |
|  | 1 | 0 | 0 | 30 | 205 |
|  | 1 | 0 | 0 | 50 | 386 |

TABLE 2-continued

| Set | Polyethylene phr | Poly-F phr | Graphite phr | Moly-S phr | Taber Test mg lost (low No. best) |
|---|---|---|---|---|---|
|   | 1 | 0 | 1 | 0 | 28 |
| 4 | 1 | 0 | 2 | 0 | 30 |
|   | 1 | 0 | 5 | 0 | 28 |
|   | 1 | 0 | 10 | 0 | 40 |
|   | 1 | 1 | 1 | 0 | 15 |
| 5 | 1 | 1 | 0 | 1 | 17 |
|   | 1 | 1 | 1 | 1 | 20 |
|   | 1 | 1 | 1 | 0 | 12 |

What is claimed is:

1. An elastomeric polyurethane containing a combination of abrasion resistance additives which comprise (a) a waxing agent, (b) a powdered mineral type lubricant and (c) a polyhalogenated polyalkylene powder.

2. The polyurethane of claim 1 wherein said additives are present in combined amounts of from about 0.1 to 10% by weight based on the polyurethane.

3. The polyurethane of claim 1 wherein from 0.5 to 5% of said additives are used.

4. The polyurethane of claim 1 wherein said waxing agent is polyethylene wax, said powdered mineral type lubricant is graphite, and said polyhalogenated polyalkylene powder is polyfluorinated polyethylene.